United States Patent [19]
Gershen

[11] Patent Number: 5,654,857
[45] Date of Patent: Aug. 5, 1997

[54] GROUND FAULT CIRCUIT INTERRUPT SYSTEM INCLUDING AUXILIARY SURGE SUPPRESSION ABILITY

[75] Inventor: Bernard Gershen, Centerport, N.Y.

[73] Assignee: Leviton Manufacturing Co., Inc., Little Neck, N.Y.

[21] Appl. No.: 504,211

[22] Filed: Jul. 19, 1995

[51] Int. Cl.$^6$ ...................................................... H02H 3/00
[52] U.S. Cl. ................................ 361/42; 361/45; 361/118
[58] Field of Search ................................ 361/42, 43, 45, 361/118, 56, 93

[56] References Cited

U.S. PATENT DOCUMENTS

| | | | |
|---|---|---|---|
| 4,023,071 | 5/1977 | Fussell | 361/56 |
| 4,271,446 | 6/1981 | Comstock | 361/56 |
| 4,518,945 | 5/1985 | Doyle et al. | 340/310 A |
| 4,740,859 | 4/1988 | Little | 361/56 |

Primary Examiner—Jeffrey A. Gaffin
Assistant Examiner—Stephen Jackson
Attorney, Agent, or Firm—Paul J. Sutton

[57] ABSTRACT

A ground fault circuit interrupt system with auxiliary surge suppression ability is provided which includes line-side system, phase, neutral and ground terminals electrically connectable to phase, neutral and ground terminals of an AC source and load-side system, phase, neutral and ground terminals electrically connectable, respectively, to phase, neutral and ground terminals of an electrical load. The system includes a ground fault circuit interrupter including line- and load-side phase and neutral ports for electrical connection to the line-side system, phase and neutral terminals for controlling a state of conduction of AC between the source and electrical load in accordance with a detection of an interrupt condition. A relay switch is also included which has a relay coil and phase and neutral contacts such that line and load ends of the phase contact are electrically connected, respectively, to a GFCI load-side phase port and load-side system, phase terminal, line and load ends of the neutral contact are electrically connected, respectively, to a GFCI load-side neutral port and load-side system, neutral terminal; and the relay coil is electrically coupled between the load ends of the phase and neutral contacts for controlling said contacts in response to the interrupt condition. First second and third transient voltage surge suppressors electrically connected between the line-side system, phase and neutral terminals, phase and ground terminals and neutral and ground terminals for transient voltage surge suppression protection.

8 Claims, 2 Drawing Sheets

GROUND FAULT CIRCUIT INTERRUPT SYSTEM INCLUDING AUXILIARY SURGE SUPPRESSION ABILITY

BACKGROUND OF THE INVENTION

The present invention relates to ground fault circuit interrupters (GFCIs) and, more particularly, to GFCI devices which include auxiliary surge suppresser circuitry.

Ground fault circuit interrupters (GFCIs) were developed to meet a great need for a device capable of detecting the presence of abnormal current flow within a circuit system, e.g., faulted current flow from a phase line to ground, and immediately interrupting power to the faulted line to protect persons from electric shock, fire and explosion. Prior to GFCI development, differential circuit breakers were known and used in certain European countries to provide ground fault protection to circuit systems. Differential circuit breakers include a differential transformer with a core through which two conductors, e.g., connecting a circuit system to phase and neutral lines of a power source, which are being monitored for abnormal leakage current pass. The two conductors act essentially as primary windings relative the core. The differential circuit breaker also includes current interrupting contacts, which, in the event of a detected short or abnormal leakage current, are forced to a high impedance or "off" state, i.e., an open-circuited state. The state of the contacts is controlled by a semiconductor device which is energized by a secondary of the differential transformer. Such devices, however, are found to be current-sensing insensitive and, therefore, ineffective to ensure complete protection for human life.

GFCIs evolved from differential circuit breaker technology. GFCIs essentially comprise a current sensor with a circuit breaker connected between neutral and phase conductors, interposed between a power source and a load. GFCIs also include a differential transformer circumscribing the neutral and phase conductors. The circuit breaker is actuated when the differential transformer senses that more current is flowing into the load from the source through the phase conductor than is flowing back to the source through the neutral conductor, functioning essentially as primary and secondary windings of the differential transformer. A tertiary winding of the differential transformer is disposed proximate the neutral conductor in the vicinity of the load in which a current is induced in the event of a grounding (i.e., a sensed current imbalance). If the induced current is large enough, the circuit breaker contacts are forced open.

One known GFCI system includes a differential transformer comprised of a toroidal core through which several line conductors pass to form primary windings of at least one turn. A secondary winding of the differential transformer serves as an output winding and is also connected to a GFCI circuit. A trip coil of a circuit breaker having a plurality of contacts in line with the line conductors is energized with a minimum current. A pulse generator is coupled to the neutral conductor for producing a high frequency current upon grounding of the neutral conductor between the differential transformer and the load. The high frequency current is produced by the periodic firing of a diac when a voltage on a capacitor connected thereto is applied to the output winding. The high frequency pulses induce voltage pulses in the neutral conductor passing through the transformer core. The induced voltage pulses do not effect the current balance in the distribution system as long as the neutral conductor is not grounded on the load side of the transformer. If a grounding occurs, however, the voltage pulses produce a current in the neutral conductor which does not appear in any of the line conductors. A consequential imbalance is detected by the ground fault sensing means and the contacts are forced to an open state, interrupting the flow of current in the distribution system.

A variation on a conventional GFCI is an intelligent ground fault circuit interrupt (IGFCI) system, disclosed in commonly owned U.S. patent application Ser. No. 08/435,021, filed May 4, 1995 and incorporated herein by reference. The IGFCI system includes a GFCI, a differential transformer through which a pair of conductors pass and switching means in line with the conductors and responsive to the GFCI. The switching means defines either a conductive or non-conductive state in accordance with system current-flow balance. Included detection circuitry determines a miswiring condition in the system whether the switching means is in a closed or open circuited state. The system also includes test means which alert the user for a need to test the device and which actually implement the required testing.

Another variation on conventional GFCI circuitry includes a GFCI with transient voltage surge suppression (TVSS) ability between phase and neutral lines therein, i.e., single mode protection. A TVSS device, e.g., a metal oxide varistor or MOV, is electrically connected between line-side phase and neutral conductors or terminals of the GFCI to protect connected circuitry from transient overvoltages. TVSS devices, commonly referred to as surge suppressors or voltage-clamping devices, typically include nonlinear, voltage-dependent resistive elements which display electrical behavior similar to that displayed by a pair of series-connected, back-to-back zener diodes. At normal voltages, (i.e., below the TVSS clamping voltage level), TVSS devices display a high resistance with a small leakage current. When subjected to large transient voltages (above the TVSS clamping voltage), the TVSS device is forced by its characteristics to operate in a low resistance region enabling large current flow through the device. The increased current produces an increased voltage drop across the source impedance, effectively clamping the transient voltage to a level determined acceptable (i.e., safe) for the protected circuit. The potentially destructive surge energy is thereby dissipated or passed through the voltage-clamping (TVSS) device and its operating current returns to its normal range after the surge. Examples of TVSS devices are the avalanche diode suppresser, metal oxide varistors (MOVs) and selenium surge suppresser While GFCIs which include conventional TVSS protection circuitry connected across phase and neutral lines offer protection thereat, greater transient voltage surge suppression protection is at times needed. For example, electrical receptacles offering both ground fault protection and transient voltage surge suppression between each node in a protected circuit, i.e., phase to neutral, phase to ground and neutral to ground, would be well received.

OBJECTS AND SUMMARY OF THE INVENTION

It is therefore an objective of the present invention to provide a ground fault circuit interrupter (GFCI) device which includes transient voltage surge suppression means to overcome the shortcomings of the prior art.

Another object of the present invention is to provide a ground fault circuit interrupter (GFCI) system which includes voltage surge suppression circuitry to protect the GFCI and GFCI-connected circuitry from transient overvoltages.

Another object of the present invention is to provide a GFCI system which includes voltage surge suppression protection at all nodes within the circuit system in which it is disposed.

The present invention provides a ground fault circuit interrupt system which includes a ground fault circuit interrupter (GFCI) for electrical connection between an AC source and a load. The GFCI controls a state of conduction or current flow between the source and the load in accordance with the detection of an interrupt condition. The system includes transient voltage surge suppression circuitry between each separate conductor operating therein, i.e., each of the systems' three electrical nodes (in a three-conductor system). The GFCI is electrically connected to phase and neutral terminals of the AC source via phase and neutral conductors. The GFCI acts in conjunction with a relay switch which includes a relay coil and phase and neutral contacts for defining a state of conduction therebetween. Phase and load ends of the phase contact are electrically connected, respectively, to a load side phase port of the GFCI and a phase terminal of a load. Phase and load ends of the neutral contact are electrically connected, respectively, to a load side neutral port of the GFCI and a neutral terminal of the load. The relay coil controls the state of the contacts (i.e., non-conducting or conducting state) in response to an interrupt signal generated in the GFCI in response to a difference in current flowing through. Three TVSS devices, preferably MOV devices, are electrically connected, respectively, across the phase and neutral conductor, across the phase and ground conductor, and across the neutral and ground conductor at the line end side of the GFCI. Because the three TVSS devices, in combination with the GFCI, require substantially more physical volume than a GFCI system including only single-node protection, i.e., one TVSS device typically connected between phase and neutral line-side system terminals, the GFCI/surge suppresser combination disclosed by the present invention is preferably limited to a single receptacle at its face. This is to maintain the present external dimensions of the conventional GFCI receptacle to enable the GFCI/surge suppresser described herein to be installed in a normal wall box without the need to extend the system out from the wall surface.

The various objects and features of the invention will be apparent from the following description in which the preferred embodiments are set forth in detail in conjunction with the accompanying drawings.

DETAILED DESCRIPTION OF THE INVENTION

Figure 1:
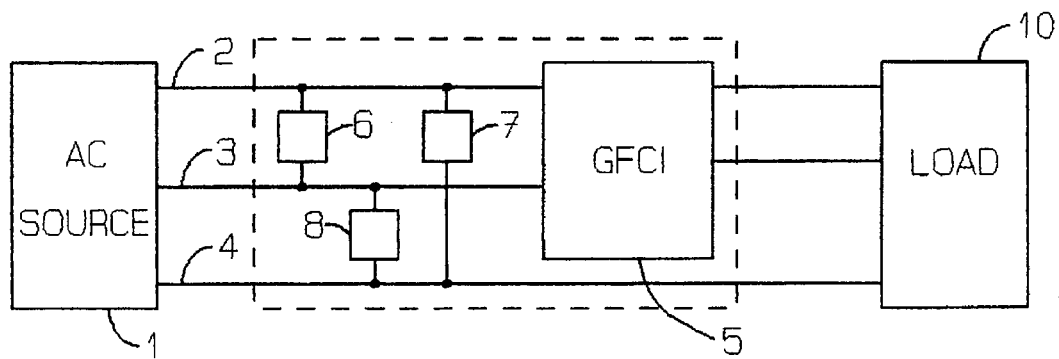
FIG. 1 is a functional block diagram of a preferred embodiment of the present invention.

FIG. 1 shows a ground fault circuit interrupt system with auxiliary surge suppression ability of the present invention electrically connected to an AC power source 1. The power source is shown coupled via phase, neutral and ground conductors 2, 3, 4 to phase, neutral and ground terminals of a load via a ground fault circuit interrupter 5. Also shown in the figure are three TVSS devices, 6, 7, 8, electrically connected between phase and neutral, phase and ground, and neutral and ground conductors within the system. The TVSS devices offer full surge suppression protection, i.e., at each of the three electrical nodes. Such protection is distinguished from conventional protection wherein a single TVSS device may be electrically connected between phase and neutral conductors thereby offering single node protection to the GFCI and its connected load. That is, whether transient overvoltage signals are present between phase and ground, phase and neutral, or neutral and ground, the GFCI 5 and load 10 are protected. It should be noted that the description provided herein, while directed to surge-suppression protection at the three nodes of a single-phase AC source, is not limited thereto. The invention may also offer surge suppression protection for all three phases of a three-phase AC source connected through a GFCI is available herewith. For example, a TVSS could be included between first phase and neutral, second phase and neutral, third phase and neutral, first phase and ground, second phase and ground, third phase and ground, and neutral and ground without departing from the scope and spirit herein.

Figure 2:
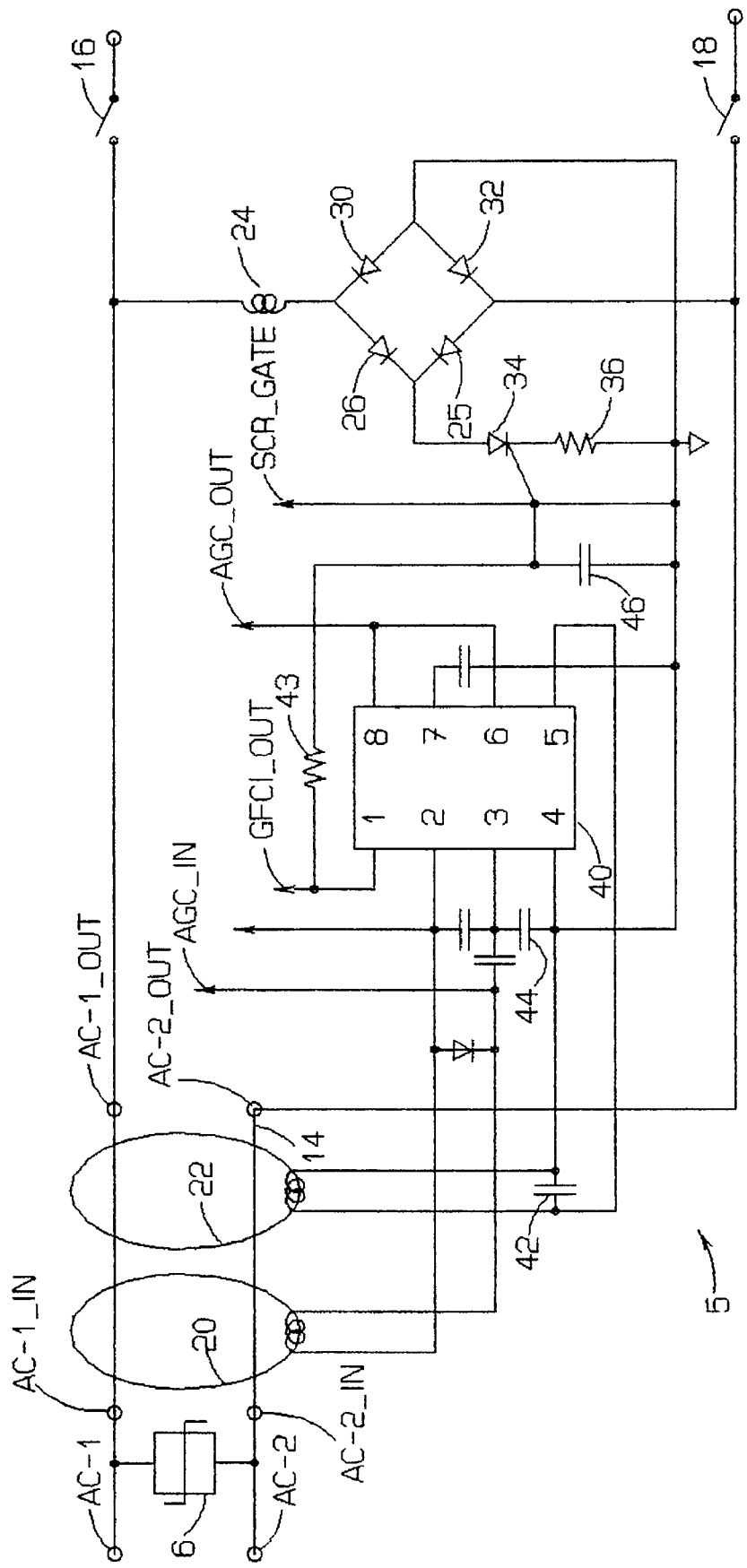
FIG. 2 is a detailed schematic diagram of a GFCI which may be implemented within the embodiment of FIG. 1.

GFCI circuit 5, will now be described in greater detail with reference to FIG. 2. GFCI terminals AC-1 and AC-2 are electrically connectable to phase and neutral conductors extending from an AC source and to GFCI phase and neutral line terminals AC-1_IN and AC-2_IN. A TVSS device or MOV 6 is electrically connected across AC-1 and AC-2. A first or phase conducting element 12 connects terminal AC-1_IN to terminal AC-1_OUT, and a second or neutral conducting element 14 electrically connects terminal AC-2_IN to terminal AC-2_OUT. Terminals AC-1_OUT and AC-2_OUT are also electrically connected to line sides of contacts 16, 18, respectively. Conducting elements 12, 14 are positioned such that they extend through a pair of magnetic cores 20, 22, which sense AC flowing into and out of the system described herein. Terminal AC-1_OUT also is electrically connected to a first end of relay coil 24; a second end of relay coil 24 is electrically connected to an anode end of a diode 26 and a cathode end of diode 30, which together with diodes 25, 32, form a portion of a diode bridge. Cathode ends of diodes 25, 28 are electrically connected to an anode end of an SCR 34. The cathode end of SCR 34 is connected to a first end of a resistor 36, a second end of which is connected to floating ground.

Magnetic core 20 generates a signal AGC_IN which is proportional to an amount of current flowing into the GFCI via conductor 12 and provides the signal as input to pins 2 and 3 of a semiconductor device 40 (i.e., an LM1851). Magnetic core 22 generates a signal which is proportional to an amount of current flowing back from the GFCI (in neutral conductor 14) and provides the signal across a capacitor 42. A first end of capacitor 42 is also connected to a second end of a capacitor 44 as input to pin 4 of the LM1851 and to anode ends of diodes 30, 32. An anode end of diode 25 and a cathode end of diode 32 are electrically connected to a line side of contact 18. A second end of capacitor 42 is electrically connected to pin 5 of LM1851 40.

The LM1851 40 is an integrated circuit which, via its input pins, detects small differences in the current flowing through the AC-1 and AC-2 terminals, identifying ground faults thereby. Upon detection of a ground fault, the LM1851 40 conveys the fault information via the state of a signal, GFCI_OUT, provided at pin 1. Pin 1 is electrically connected to a first end of a resistor 43, a second end of which is connected to a first end of a capacitor 46 and a gate of SCR 34. The state of the pin 1 output (i.e., signal GFCI_OUT) controls the state of SCR 34. That is, a particular voltage level at capacitor 46, which may be referred to as the SCR_GATE signal, controls the impedance state of the SCR. SCR_GATE defines the state of conduction within the SCR path to ground, which in turn defines the current flow from terminal AC-1 through conductive element 12, through the relay coil 24, diode 26, the conducting path of SCR 34, and resister 36; the neutral line current flows through diode 32, element 14 to AC-2. Current flow through the coil 24 forces the relay contacts 16, 18 to an open state, cutting off power to the load and preventing a user from being injured.

Figure 3:
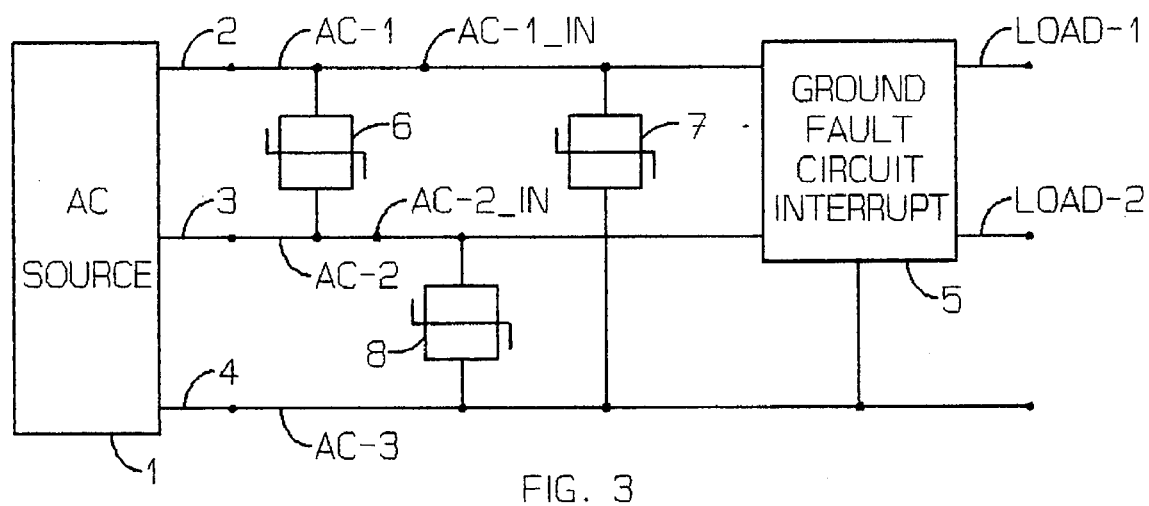
FIG. 3 is a detailed schematic diagram of an embodiment of the invention as shown in FIG. 1.

A more detailed version of ground fault circuit interrupter (GFCI) System including auxiliary surge suppression ability (hereinafter referred to as "GFCI/surge suppresser") of the present invention will now be described with reference to FIG. 3. The GFCI/surge suppresser system is shown therein to include a standard ground fault circuit interrupter (GFCI) 5 as its "core" structure (as described with reference to FIG. 3), as well as three TVSS devices (i.e., MOVs) 6, 7, 8, electrically connected across the incoming system phase and neutral, phase and ground and neutral and ground terminals (i.e., three nodes) on the line-end side of the GFCI 5 (i.e., line-side system phase, neutral and ground terminals). Installed properly, the GFCI/surge suppresser system protects the GFCI 5 circuitry, all downstream electrical devices connected to the system, and any receptacles present in the device itself. It should be noted, however, that the description of the preferred embodiment is presented merely for illustration purposes only and is not meant to limit the scope or spirit of this invention.

An AC power source 1 is connectable to the system to provide AC power therein via the line-side system phase and neutral line terminals AC-1 and AC-2. A first metal oxide varistor (MOV) 6 is shown electrically connected between phase and neutral line terminals at the line-side of the GFCI for suppressing voltage spikes, i.e., transient voltages present thereat. The line-side system ground terminal AC-3 electrically connects the system and any loads attached thereto to ground at the AC source. Second and third MOVs 8, 7 are also shown electrically connected between phase and ground and between neutral and ground terminals within the GFCI/surge suppresser system.

Line- and load-side terminals AC-1_IN and AC-2_IN of GFCI 5 are electrically connected to the phase and neutral system terminals AC-1 and AC-2, respectively. Phase and neutral conduction paths are established through the GFCI thereby, passing through a first contact 16 of a relay switch to load-side system phase terminal LOAD_1 and through a second relay contact 18 to load-side system neutral LOAD_2. Relay contacts 16, 18 pass AC present on the phase and neutral lines 2, 3 extending from the AC source 1 to the load if the GFCI 5 maintains the contacts in a closed or conductive state. The line-side system ground conductor AC-3 is preferably electrically connected directly through the system to load-side system ground terminal LOAD_3. Because of the protection provided by the three MOVs, 6, 7, 8, all three nodes or electrical AC power system entry points, both the GFCI and any downstream connected circuitry is protected not only against abnormal leakage current but from transient overvoltages.

The embodiments of the invention disclosed in the present specification, drawings and claims are presented merely as examples of the invention. Other embodiments, forms, or modifications thereof will readily suggest themselves and are contemplated as coming within the scope of the present invention.

What is claimed is:

1. A ground fault circuit interrupt system with auxiliary surge suppression capability, comprising:

line-side system phase, neutral and ground terminals electrically connectable to phase, neutral and ground terminals of an AC source, respectively;

load-side system phase, neutral and ground terminals electrically connectable, respectively, to phase, neutral and ground terminals of an electrical load;

a ground fault circuit interrupter including line- and load-side phase; and neutral ports, wherein said line-side phase and neutral ports are electrically connected to said line-side system phase and neutral terminals and said load-side phase and neutral ports are electrically connected to said load-side system phase and neutral terminals for controlling a state of conduction of AC between said source and said electrical load in accordance with a detection of an interrupt condition; and first, second, and third transient voltage surge suppressors electrically connected between said line-side system and all of the following: phase and neutral terminals, phase and ground terminals, and neutral and ground terminals, for transient voltage surge suppression protection.

2. The ground fault circuit interrupt system defined by claim 1, wherein said GFCI includes:

a relay switch including a relay coil and phase and neutral contacts, wherein line and load ends of said phase contact are electrically connected to a GFCI load-side phase port and load-side system phase terminal, respectively, wherein line and load ends of said neutral contact are electrically connected to a GFCI load-side neutral port and load-side system neutral terminal, respectively, and wherein said relay coil is electrically coupled between said load ends of said phase and neutral contacts for controlling said contacts in response to said interrupt condition.

3. The ground fault circuit interrupt system defined by claim 1, wherein said GFCI monitors a phase current flowing from a source to a load and a neutral current flowing from said load to said source, and generates an interrupt signal based on a detected difference of said monitored line and neutral currents.

4. The ground fault circuit interrupt system defined by claim 1, wherein said first, second and third TVSS devices prevent voltages present at said nodes from exceeding 400 volts.

5. The ground fault circuit interrupt system defined by claim 1, wherein said TVSS devices include metal oxide varistors.

6. The ground fault circuit interrupt system defined by claim 1, further including:

second and third line-side system phase terminals and second and third load-side system load terminals, wherein said system phase terminals are electrically connectable to corresponding phases of a three-phase AC source and said system load terminals are electrically connectable to corresponding phases of load; and fourth, fifth, sixth and seventh transient voltage surge suppressors electrically connected between;

said second line-side system phase terminal and said second line-side system neutral terminal;

said second line-side system phase terminal and said line-side system, ground terminal;

said third line-side system, phase terminal and said third line-side system, neutral terminal; and said third line-side system phase terminal and said line-side system ground terminal, whereby all three modes related to all three AC phases are both ground fault and surge suppression protected.

7. A method for detecting ground faults and maintaining a voltage clamp at a phase side of a ground fault circuit interrupt system which is electrically connected between an AC source and an electrical load such that AC flowing through said system is reliably clamped to a maximum voltage and reliably interrupted upon detection of an interrupt condition by a ground fault circuit interrupt device contained therein, comprising the steps of:

maintaining a voltage clamping function between each of: phase to neutral, phase to ground and neutral to ground conductors at a phase side input to said system;

detecting a first amount of AC flowing from said AC source to said load utilizing said ground fault circuit interrupt device;

detecting a second amount of AC flowing from said load to said AC source utilizing said ground fault circuit interrupt device;

generating a difference signal indicative of a difference between said first and second amounts of AC;

comparing said difference signal to a reference signal which is proportional to a maximum allowable system current flow difference and defining an interrupt condition in response thereto; and interrupting said flow of AC upon occurrence of said condition.

8. A ground fault circuit interrupt system which includes auxiliary surge suppression capability, comprising:

a housing including a receptacle for creating an electrical path from said system to each of a phase, neutral and ground conductor; and a ground fault circuit interrupter disposed in said housing for conditionally coupling said path to each of a phase, neutral and ground terminal of an AC source, said GFCI system including first, second and third transient voltage suppression devices electrically coupled across said phase and neutral conductors, said phase and ground conductors and said neutral and ground conductors such that said system performs both a ground fault circuit interrupt function and a transient voltage surge suppression function.

* * * * *